United States Patent [19]

Kappele

[11] Patent Number: 5,145,519
[45] Date of Patent: Sep. 8, 1992

[54] SPECIFIC DYE SET FOR THERMAL INK-JET PRINTING

[75] Inventor: William D. Kappele, Loveland, Colo.

[73] Assignee: Hewlett-Packard Company, Palo Alto, Calif.

[21] Appl. No.: 807,924

[22] Filed: Dec. 16, 1991

[51] Int. Cl.$^5$ ............................................. C09D 11/02
[52] U.S. Cl. ....................................... 106/22; 106/20
[58] Field of Search ................................. 106/20, 22

[56] References Cited

U.S. PATENT DOCUMENTS

| | | | |
|---|---|---|---|
| 3,951,668 | 4/1976 | Schumacher et al. | 106/30 |
| 4,425,162 | 1/1984 | Sugiyama et al. | 106/22 |
| 4,500,355 | 2/1985 | Shimada et al. | 106/22 |
| 4,601,756 | 7/1986 | Chiba et al. | 106/22 |
| 4,818,285 | 4/1989 | Causley et al. | 106/22 |
| 4,864,324 | 9/1989 | Shirota et al. | 106/22 |
| 5,017,227 | 5/1991 | Koike et al. | 106/22 |

*Primary Examiner*—Mark L. Bell
*Assistant Examiner*—Helene Klemanski

[57] ABSTRACT

A specific dye set, comprising Direct Yellow 86, Acid Red 52, and Acid Blue 9, yields true, vivid colors on transparency film and special coated paper. This dye set, which is intended for 180 dpi thermal ink-jet printers, is a distinct improvement over prior art dye sets.

5 Claims, 1 Drawing Sheet

FIG. 1
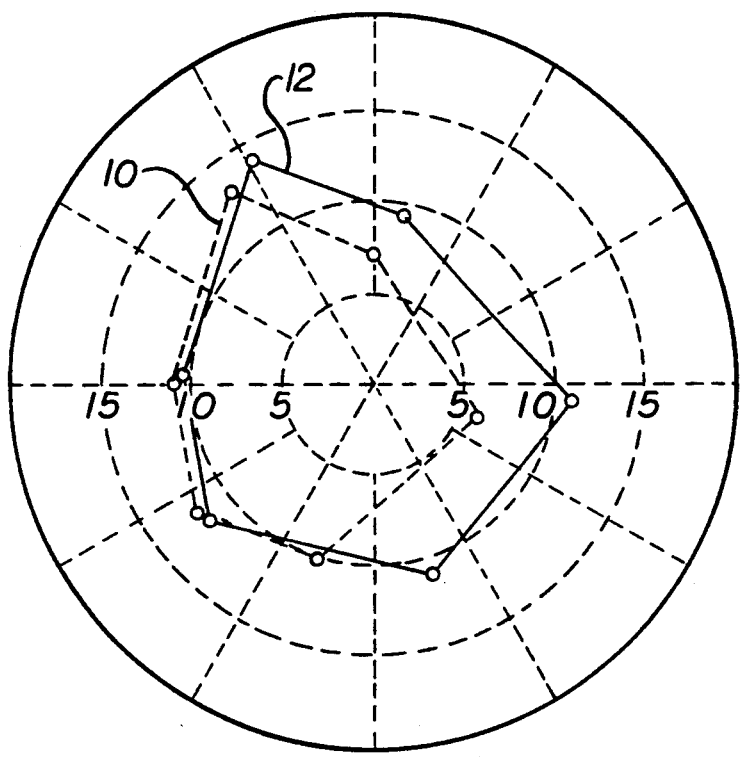
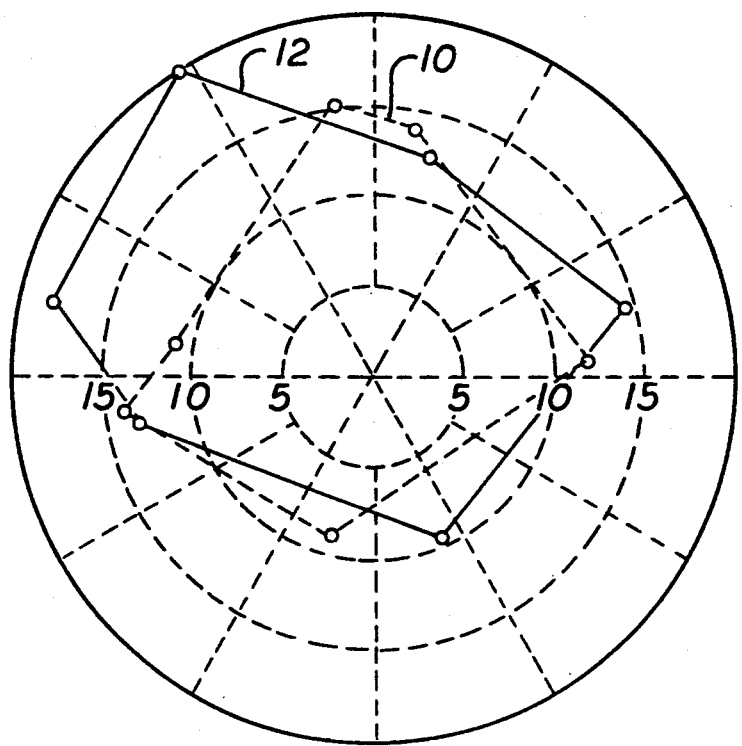
FIG. 2

SPECIFIC DYE SET FOR THERMAL INK-JET PRINTING

CROSS-REFERENCE TO RELATED APPLICATIONS

The present application is related to patent application Ser. No. 07/749,740, filed Aug. 26, 1991, and commonly owned by the same assignee as the present application.

TECHNICAL FIELD

The present invention relates to thermal ink-jet printing, and, in particular, to a specific dye set suitable for use with overhead transparencies and special coated paper.

BACKGROUND ART

In a commercially available thermal ink-jet printer, known as PAINTJET® and available from Hewlett-Packard Company, Palo Alto, Calif., yellow, magenta, and cyan colors are provided by inks containing one of two specific dye sets. In the first dye set, yellow, magenta, and cyan colors are provided by inks containing Direct Yellow 86, Direct Red 227, and Acid Blue 9, respectively, while in the second dye set, these colors are provided by inks containing Acid Yellow 23, Acid Red 52, and Acid Blue 9.

The first dye set yields poor color, chroma, and trueness in concentration ranges suitable for the thermal ink-jet pen when jetted onto overhead transparencies. The second dye set yields excellent hues and chromas, but evidences red fading to the magenta in very short time periods upon exposure to light.

It is desirable to provide a dye set that can be used with overhead transparencies and with the special coated paper used in the PAINTJET® printer to provide vivid, true colors that do not fade upon exposure to light.

DISCLOSURE OF INVENTION

In accordance with the invention, a specific dye set, comprising Direct Yellow 86, Acid Red 52, and Acid Blue 9 yields true, vivid colors on transparency film and coated paper. The color print quality on both transparency media and coated paper is superior to either of the prior art dye sets. Specifically, the dye set of the invention provides colors with higher Munsell chroma (more vivid colors) and more correct Munsell hue (truer colors) than the dye set of the prior art. Further, color fading upon exposure to light is minimal, as measured by a change in ΔE (or a change in L*, a*, b* values) over a period of time when exposed to light at a specific spectral intensity. The L*a*b* coordinate system refers to colorspace in which measurements are made. ΔE is obtained by taking the square root of the sum of the squares of the differences of two samples (e.g., before and after exposure to light).

BRIEF DESCRIPTION OF THE DRAWINGS

FIG. 1 is a color gamut comparison on Munsell coordinates, comparing the dye set of the invention with a dye set of the prior art on transparency film; and FIG. 2 is a color gamut comparison on Munsell coordinates, comparing the dye set of the invention with a dye set of the prior art on special coated paper.

BEST MODES FOR CARRYING OUT THE INVENTION

The following invention is directed to a specific dye set for use with a 180 dot-per-inch (dpi) thermal ink-jet printer, such as Hewlett-Packard's PAINTJET® printer. It provides results that are superior to other dye sets presently used on such a printer. The dye set would also work fine on 300 dpi printers.

The dye set of the invention comprises inks containing Direct Yellow 86, Acid Red 52, and Acid Blue 9. It is often desirable to replace the cation with which the dye is associated (usually, sodium) in order to optimize the performance of the ink for a particular ink-jet printhead. However, it should be noted that the particular ionic form is irrelevant to the practice of the invention.

For use with a 180 dpi printhead, the yellow dye is first treated to replace the as-supplied sodium counterion on the dye with tetramethylammonium cation. This is to prevent crusting of the printhead nozzles by the ink.

Specifically, Direct Yellow 86-Na is purified and ion-exchanged to the tetramethylammonium (TMA) form simultaneously by the method described in U.S. Pat. No. 4,685,968. The use of the TMA cation is described in U.S. Pat. No. 4,761,180. The process of forming the TMA form of the dye and its composition are thus known in the art and form no part of this invention.

The Direct Yellow 86-TMA dye is then mixed with deionized (DI) water and diethylene glycol in the following proportions:

| | |
|---|---|
| Direct Yellow 86-TMA | about 0.5 to 5 wt %; |
| diethylene glycol | about 30 to 60 wt %; and |
| water (deionized) | balance. |

Preferably, the amount of Direct Yellow 86-TMA dye is about 4 wt % for a 180 dpi printhead and the amount of diethylene glycol is 60 wt %. Since bleed occurs more at 60 wt % than at the lower concentrations of diethylene glycol, the concentration of DEG should not exceed this value.

The ink (4 wt % dye) made above has the following properties:

| | |
|---|---|
| pH | 7 |
| surface tension | 53 dyne/cm |
| density | 1.1 g/ml |
| conductivity | 1.31 mmho/cm |
| viscosity | 9.5 cp |
| Lambda maximum | 380 nm |
| dilution factor | 5000 |
| absorbance | 0.40. |

Acid Red 52-Na is processed as described above to replace the sodium cations, but with lithium cations instead of TMA cations, to form Acid Red 52-Li. That is, the ion-exchange column is loaded with lithium cations and the dye concentrate poured through the column. The use of the Li cation is described in U.S. Pat. No. 4,994,110. The process of forming the Li form of the dye and its composition are thus known in the art and form no part of this invention.

The Acid Red 52-Li dye is then mixed with deionized (DI) water and diethylene glycol in the following proportions:

| Acid Red 52-Li | about 1 to 5 wt %; |
|---|---|
| diethylene glycol | about 30 to 60 wt %; and |
| water (deionized) | balance. |

Preferably, the amount of Acid Red 52-Li is about 4 wt % for a 180 dpi printhead and the amount of diethylene glycol is about 60 wt %.

The ink (4 wt % dye) made above has the following properties:

| pH | 7 |
|---|---|
| surface tension | 53 dyne/cm |
| density | 1.1 g/ml |
| conductivity | 5.78 mmho/cm |
| viscosity | 8.2 cp |
| Lambda maximum | 566 nm |
| dilution factor | 5000 |
| absorbance | 1.13. |

Acid Blue 9-Na is purified as above and the dye concentrate is mixed with DI water and diethylene glycol to form an ink having the formulation:

| Acid Blue 9-Na | about 1 to 5 wt %; |
|---|---|
| diethylene glycol | about 30 to 60 wt %; and |
| water (deionized) | balance. |

Preferably, the amount of Acid Blue 9-Na is about 3 wt % for a 180 dpi printhead and the amount of diethylene glycol is about 60 wt %.

The ink (4 wt % dye) made above has the following properties:

| pH | 7 |
|---|---|
| surface tension | 53 dyne/cm |
| density | 1.1 g/ml |
| conductivity | 1.06 mmho/cm |
| viscosity | 5.1 cp |
| Lambda maximum | 630 nm |
| dilution factor | 5000 |
| absorbance | 1.02. |

Using the inks from above on a 180 dpi thermal ink-jet printer, various media were printed on, including transparency, such as mylar, and two special coated papers, commercially available for Hewlett-Packard's PaintJet ® printer. The inks cannot be printed easily on plain paper, due to the high diethylene glycol content, which causes bleeding and feathering on plain paper.

FIG. 1 shows the color gamut comparison on Munsell coordinates (for printing on transparencies) for the dye set of the prior art (Curve 10) and for the dye set of the invention (Curve 12). The radius measures chroma. It is readily seen that the dye set of the invention can reproduce a larger number of colors than a dye set of the prior art, comprising Direct Yellow 86, Direct Red 227, and Acid Blue 9. The inks of the invention show a significant improvement in the red (R), yellow (Y), green (G), and purple (P) regions, with comparable performance elsewhere. In the Figures, B is blue.

Specifically, the goal of 5 R for red hue is nearly met with a hue of 3 R at a chroma of 19, which compares to the current PAINTJET ® ink of 10 RP with a chroma of 7. The correct hue combined with this high chroma yield a very good red. The blue hue moved only from the desired value of 5 PB (achieved by current PAINT-JET ® inks) to 6 PB, while chroma remained at 11. Red and blue completely define the cyanyellow-magenta set, but a good green is also required. The dye set of the invention yields a true green at 5 G with a chroma of 11, as compared to the current PAINTJET ® ink set hue of 5 BG with a chroma of 10. Yellow moved to 7 Y with a chroma of 11, compared with the current PAINTJET ® yellow at 10 Y with a chroma of 6.

The black and cyan inks remain exactly the same in terms of dye; however, the preferred dye loading is increased from 4 to 5 wt % of the ink. The magenta ink uses a different dye than the prior art ink, while the preferred dye loading of the yellow dye is increased from 1 to 4 wt % of the ink and the yellow dye is changed to the tetramethylammonium form, for the reason stated above. In all cases, the desired vehicle comprising 40 wt % water and 60 wt % diethylene glycol is retained. Bleed has increased somewhat because the dyes used in the present application have a greater mobility. However, this is not considered to be objectionable in view of the improvement in color.

FIG. 2 is a plot similar to that of FIG. 1, but showing printing on special coated paper. The coated paper used was that conventionally employed for this printer. The red hue moved from 3 R to 4 R, which chroma decreasing from 14 to 12. This is somewhat undesirable, but is considered an acceptable loss due to overall gamut increase and significantly improved transparencies. Blue hue moved from 8 PB to 9 PB, and chroma increased from 11 and 18. This slight move away from the hue goal is more than compensated for by the substantially increased chroma. Green hue moved from 4 BG at a chroma of 9 to a truer green at 4 G with a chroma of 10. Yellow moved away from a true 5 Y yellow from 4 Y to 1 Y, but this was negligible in light of the increase in chroma from 12 to 14.

The dye set of the invention is intended for use on 180 dpi thermal ink-jet printers, and will work on higher resolution printers, such as 300 DPI printers.

The advantages provided by the dye set of the invention include (1) improved color gamut, (2) overhead transparencies do not appear washed out, and (3) primary and secondary colors are bright and true.

INDUSTRIAL APPLICABILITY

The specific dye set disclosed herein is expected to find commercial use in thermal ink-jet printers having at least 180 dpi capability.

What is claimed is:

1. A dye set for use with thermal ink-jet printers having at least 300 dpi print capability consisting essentially of Direct Yellow 86, Acid Red 52, and Acid Blue 9.

2. The dye set of claim 1 wherein Direct Yellow 86 dye molecules are associated with tetramethylammonium cations.

3. The dye set of claim 1 wherein Acid Red 52 dye molecules are associated with lithium cations.

4. A set of inks containing yellow, magenta, and cyan dyes for thermal ink-jet printers having at least 300 dpi print capability, said yellow ink having the formula

| Direct Yellow 86 | about 0.5 to 5 wt % |
|---|---|
| diethylene glycol | about 30 to 60 wt % |
| water | balance, | said magenta ink having the formula

| | |
|---|---|
| Acid Red 52 | about 1 to 5 wt % |
| diethylene glycol | about 30 to 60 wt % |
| water | balance, and | said cyan ink having the formula

| | |
|---|---|
| Acid Blue 9 | about 1 to 5 wt % |
| diethylene glycol | about 30 to 60 wt % |
| water | balance. |

5. The set of inks of claim 4, said yellow ink having the formula

| | |
|---|---|
| Direct Yellow 86-TMA | about 4 wt % |
| diethylene glycol | about 60 wt % |
| water | balance, | said magenta ink having the formula

| | |
|---|---|
| Acid Red 52-Li | about 4 wt % |
| diethylene glycol | about 60 wt % |
| water | balance, and | said cyan ink having the formula

| | |
|---|---|
| Acid Blue 9-Na | about 3 wt % |
| diethylene glycol | about 60 wt % |
| water | balance, | where TMA indicates the tetramethylammonium cation associated therewith, Li indicates the lithium cation associated therewith, and Na indicates the sodium cation associated therewith.

* * * * *